(12) United States Patent
Patel (10) Patent No.: US 11,673,516 B2
(45) Date of Patent: Jun. 13, 2023

(54) PROTECTIVE FRAME

(71) Applicant: Rohan Vishnubhai Patel, Bensalem, PA (US)

(72) Inventor: Rohan Vishnubhai Patel, Bensalem, PA (US)

(*) Notice: Subject to any disclaimer, the term of this patent is extended or adjusted under 35 U.S.C. 154(b) by 0 days.

(21) Appl. No.: 16/910,460

(22) Filed: Jun. 24, 2020

(65) Prior Publication Data

US 2021/0146862 A1 May 20, 2021
US 2022/0134970 A9 May 5, 2022

Related U.S. Application Data

(63) Continuation-in-part of application No. 16/432,970, filed on Jun. 6, 2019, now abandoned.

(60) Provisional application No. 62/935,666, filed on Nov. 15, 2019.

(51) Int. Cl.
*B60R 13/10* (2006.01)

(52) U.S. Cl.
CPC .................................. *B60R 13/105* (2013.01)

(58) Field of Classification Search
CPC .................................................... H04B 1/3888
See application file for complete search history.

(56) References Cited

U.S. PATENT DOCUMENTS

| | | | | |
|---|---|---|---|---|
| 8,442,604 B1* | 5/2013 | Diebel | ................ | H04M 1/7246 455/575.8 |
| 2010/0203931 A1* | 8/2010 | Hynecek | ............. | H04M 1/0202 455/575.8 |
| 2012/0181196 A1* | 7/2012 | Mongan | ................ | A45C 11/00 206/320 |
| 2013/0042581 A1* | 2/2013 | Holben | ................ | H04B 1/3888 53/473 |
| 2013/0045775 A1* | 2/2013 | Heywood | ............. | H04M 1/185 455/557 |
| 2014/0221056 A1* | 8/2014 | Gandhi | ................ | H04B 1/3888 455/575.8 |
| 2014/0274232 A1* | 9/2014 | Tages | ................... | H04B 1/3888 455/575.8 |
| 2015/0014188 A1* | 1/2015 | Pyo | ...................... | H04B 1/3888 206/37 |
| 2015/0189780 A1* | 7/2015 | Su | ......................... | H04B 1/3888 361/807 |
| 2015/0194994 A1* | 7/2015 | Soriano | ................ | H04B 1/3888 455/575.8 |
| 2016/0157573 A1* | 6/2016 | Del Moral | ............ | H04M 1/185 224/191 |
| 2016/0173158 A1* | 6/2016 | Day | .................... | H04M 1/0202 455/575.8 |
| 2016/0182114 A1* | 6/2016 | Tien | ......................... | A45F 5/00 224/191 |
| 2016/0249719 A1* | 9/2016 | Dining | ...................... | A45F 5/00 224/191 |
| 2017/0085285 A1* | 3/2017 | Stryker | ................ | H04B 1/3888 |
| 2018/0262227 A1* | 9/2018 | Lee | ......................... | A45C 11/00 |
| 2021/0126666 A1* | 4/2021 | Ng | ......................... | G06F 1/1656 |

* cited by examiner

*Primary Examiner* — Gary C Hoge (57) ABSTRACT

Disclosed is improved automobile license plate frame design. By having a slit surrounding the edge of the automobile license plate frame, the frame can be inserted onto the automobile license plate without need of removing the plate. The similar set up also can be used for other devices.

20 Claims, 12 Drawing Sheets

PROTECTIVE FRAME

CROSS-REFERENCE TO RELATED APPLICATIONS

Claims priority of U.S. Provisional application 62/935,666 filed on Nov. 15, 2019

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BRIEF SUMMARY OF THE INVENTION

The present disclosure relates generally to an automotive license plate protective frame case for an automobile License plate and also other valuable items. More so, the present invention relates to a protective case made of a non-flexible or a semi-rigid or non-stretchable material that provides maximum coverage. With a small slit at or near corners a frame made out from rigid (non-stretchable) material can be installed easily on a device. It also features a frame made from 2 pieces wherein each of the two pieces latches on the device independently. It also features a variation where both the frame pieces additionally inter-lock to one another to provide better latching strength and coverage.

It also features a variation where an outer shell is made from non-stretch-able material used in conjunction with softer layer inside to provide flexibility needed for the device to be inserted in the protective case.

The protective frame featured in this application can be made from non-stretchable material but not limited to the carbon fiber, kelvar, metal, wood or any material that is non-stretchable, semi-rigid or rigid material. The stretchable material can be but not limited to the silicone, rubber, TPU, TPE or any material that is stretchable and or flexible.

The protective frame featured in this invention can be made of hard materials or soft flexible materials. It is easy to insert a license plate and/or a device in a soft protective case; however, such soft protective cases provide low grade protection to the secured device. While protective cases made of hard material provide better protection it is difficult to insert a device in it. In an alternative version, a large portion of side walls is removed from hard protective frame that allows flexibility, which in turn allows insertion of a device in a hard protective case. This removal of significant portion of side wall compromises the safety of the secured device, in case of an accidental fall. In light of the above mentioned drawbacks, there exists a need of a protective case that allows ease of insertion of a device while providing high grade protection to the edges of the device.

DESCRIPTION OF THE DRAWINGS

Having thus described the disclosure in general terms, reference will now be made to the accompanying figure, wherein:

FIG. 12 illustrates a protective frame 1200, in accordance with an embodiment of the present disclosure; and It should be noted that a word "edge" mentioned in this invention is but not limited to surfaces surrounding the display of a device. When referred as "back surface" it's the opposite side surface to the display or display of tag numbers which generally has camera and back plate in a device and automobile license plate have a frame in the back.

It should be noted that the accompanying figure are intended to present illustrations of exemplary embodiments of the present disclosure. This figure is not intended to limit the scope of the present disclosure. It should also be noted that accompanying figure is not necessarily drawn to scale. The similar slit design concept can be used into various other applications to make protective or decorative cases out of non-stretchable materials for variety of products.

DETAILED DESCRIPTION OF THE INVENTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figure is intended and provided to illustrate embodiments of the disclosure described below and are not necessarily drawn to scale. In the drawing, like numbers refer to like elements throughout, and thicknesses and dimensions of some components may be exaggerated for providing better clarity and ease of understanding. Similar mechanism can be used in various shapes and sizes to accomplish similar goal for a protective frame made out of a non-stretchable material. The frame mentioned in this invention also can be frame cover or protective cover or protective case. The frame is designed to protect a device. A device here can be an automobile License plate TAG, mobile device, cellphone, mobile phone, mobile tablet or a portable electronic device. The protective frame can be made from non-stretchable material or stretchable material. Non-stretchable materials includes but not limited to a wooden material; a plastic material; a carbon-fiber material; a metal material; a polymer material; a non-stretchable synthetic material; an aramid-fiber material; a non-stretchable; a non-synthetic material. A stretch-able material includes but not limited to a synthetic material; a non-synthetic material; a metal like material; a wood like material; a plastic like material; a silicone like material; a carbon-fiber material; a polymer material; a non-stretchable synthetic material; an aramid-fiber material; a non-stretchable material; a non-synthetic material; a stretchable material; a glass like material.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item. The entire purpose of the invention is to allow flexibility by having a slit or slits for a frame to be inserted on a device.

Figure 1:
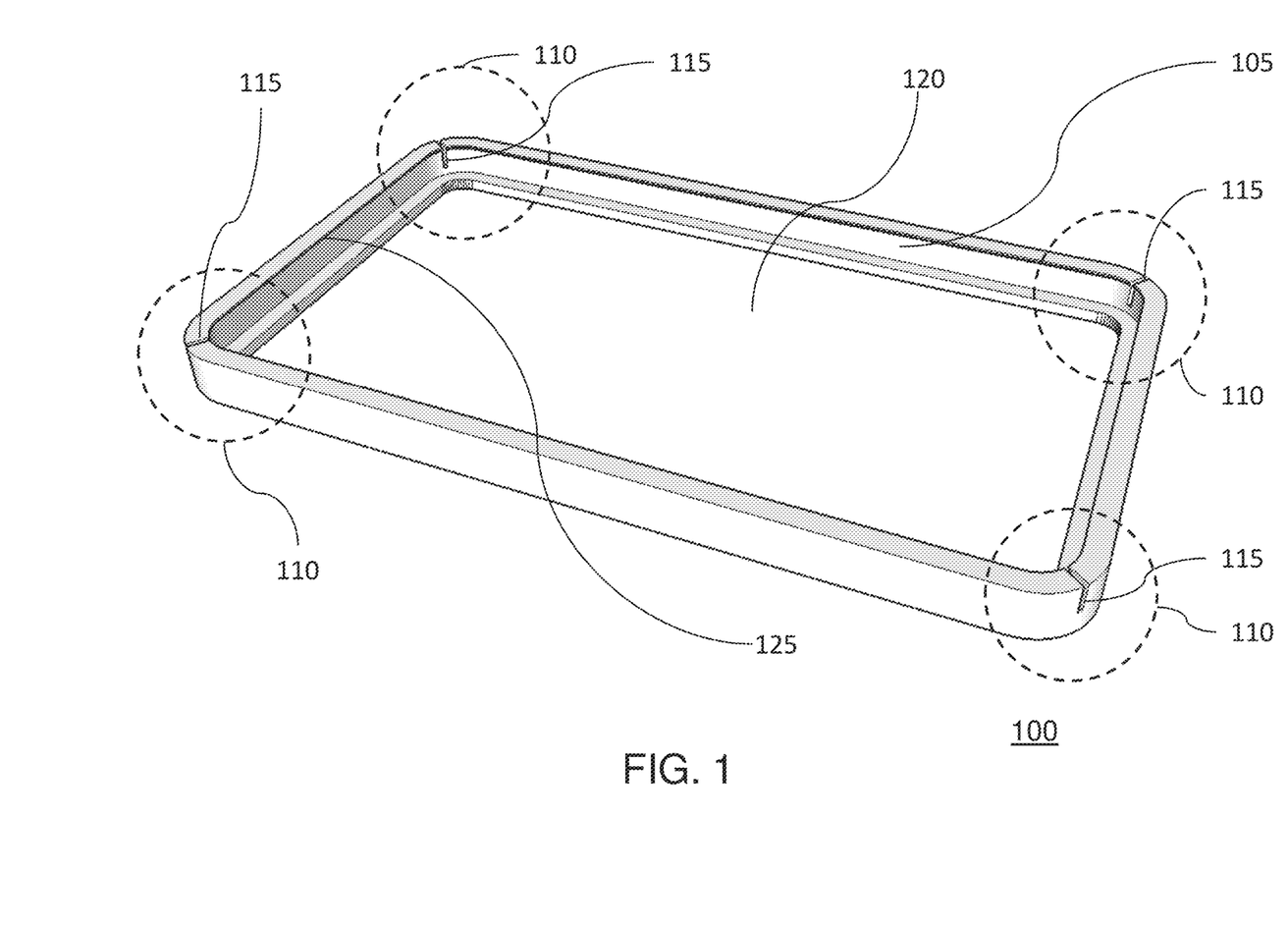
FIG. 1 illustrates a protective frame 100, in accordance with an embodiment of the present disclosure.

FIG. 1 illustrates a protective frame 100, in accordance with an embodiment of the present disclosure. The protective frame 100 has an edge surface 105. The edge surface 105 is designed to provide protection to all sides perpendicular and surrounding to the display of the device. The device is not shown in the FIG. 1 for the sake of clarity. The edge surface 105 of the protective frame 100 is made of a semi-rigid or a non-flexible or a non-stretchable material. A semi-rigid or non-flexible or non-stretchable can be aluminium like metal, plastic, wood, a carbon-fiber, aramid-fiber, synthetic material or a non-synthetic material or a similar non-flexible or non-stretch-able material. The edge surface 105 secures a device. The edge surface 105 has a plurality of corner regions 110. Each of the plurality of corner regions 110 has one or more slits 115 as shown in FIG. 1. The slits can be in various numbers or in various regions of the edge to provide flexibility needed for the device to be inserted in the protective frame 100. The at least one slit needed for entire edge surface is also possible depending on the region the slit is. At least one slit also can be featured at or near the corner of the protective case. The one or more slits 115 to provide little flexibility to the corner region to enable insertion of a device in the protective frame 100. In an embodiment of the present disclosure, the one or more slits 115 can be partial or full. The slit 115 can stop in the middle of the edge 105 or can be reaching substantially near a bottom of the edge 105. The back surface 120 has an opening in the centre to provide a view to the back of the device or to the front screen of the device since the frame configuration can be used wise-versa. The back surface 120 can be made of a semi rigid or a non-flexible material. Also the back surface 120 can be of a substantially square shape or a substantially rectangular shape or any other shape. In another embodiment of the present disclosure, the slit 115 is a partial slit. It will be understood to a person ordinarily skilled in the art that the one or more slits 115 can be deeper or shallower or in multiple numbers in the edge region of entire protective case. In accordance with various embodiments of the disclosure, there could be any number of slits in the corner region 110 and or on the edge region 105 that protects side of the device. In an embodiment of the present disclosure, the protective frame 100 has a lip 125. The lip 125 secures a device to the protective frame 100. It should be noted that the lip 125 can be of several shapes/sizes and can be placed at different locations on the protective frame 100. The lip also can be configured but not limited to as a part of the edge. The lip also can be on the top and the bottom of the edge surface 105 to secure the device from slipping out of it from top or bottom. This protective frame 100 also can be configured to be inverted wherein the protective frame is inserted on the device from top instead of bottom. As shown in FIG. 1 the edge wall can provide protection to the entire side of the device. Also a slit can be wide enough to serve a dual purpose of providing enough flexibility so the frame can be inserted over a device and provide functionality to operate the device. Also as shown in FIG. 1 & FIG. 3 the edge surface can be as tall to provide protection to entire side section's height from bottom to the top.

Figure 2:
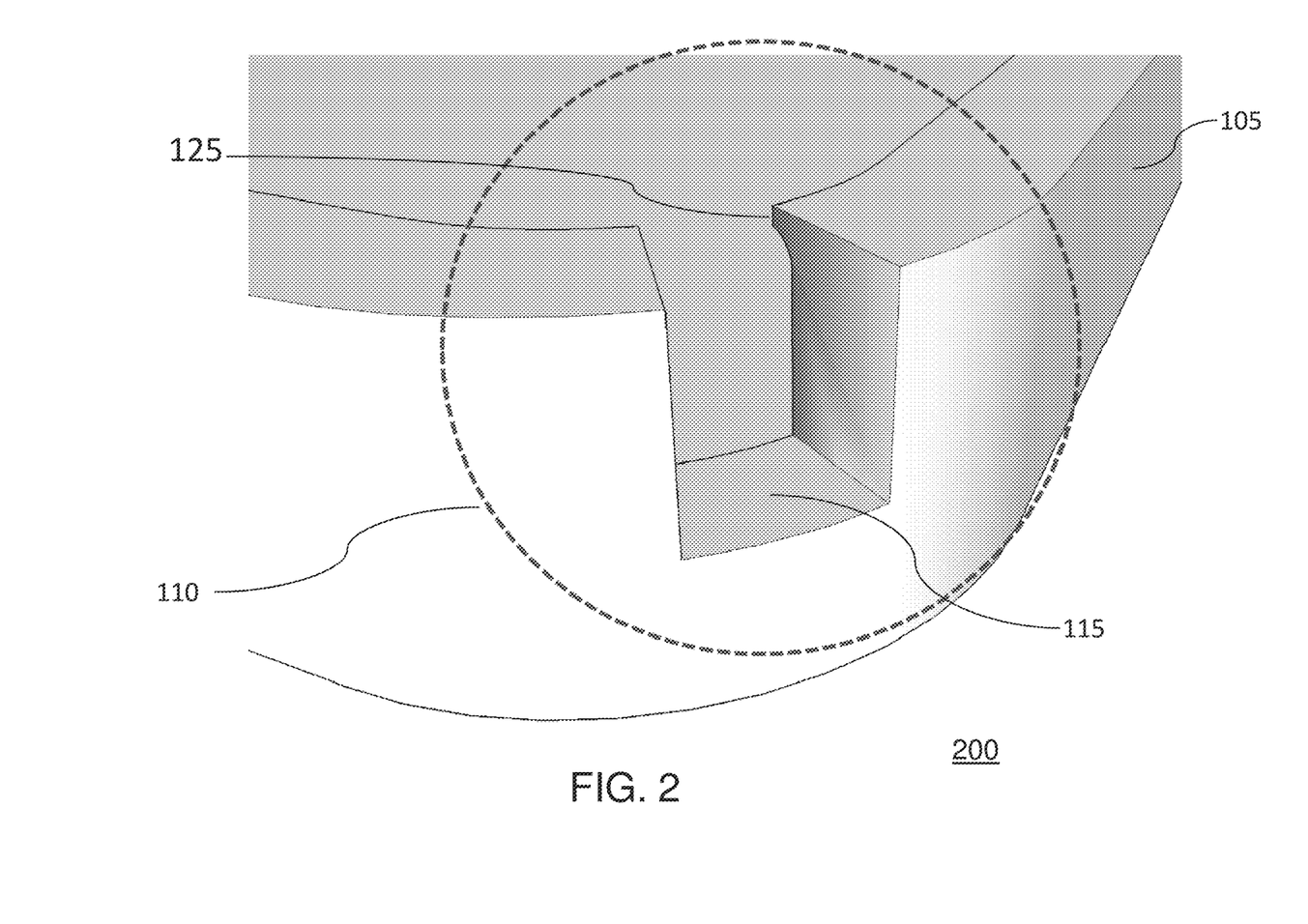
FIG. 2 illustrates a view of a slit and a lip at a corner region of a protective frame 200, in accordance with an embodiment of the present disclosure.

FIG. 2 illustrates a closer view of the corner region 110 of the protective frame 200, in accordance with an embodiment of the present disclosure. The corner region 110 is shown to include one slit 115 and a lip 125. It will be apparent to a person ordinarily skilled in the art that various shapes, sizes and numbers of slits are possible in the entire edge 105 surrounding the device, without affecting the scope of the present disclosure.

Figure 3:
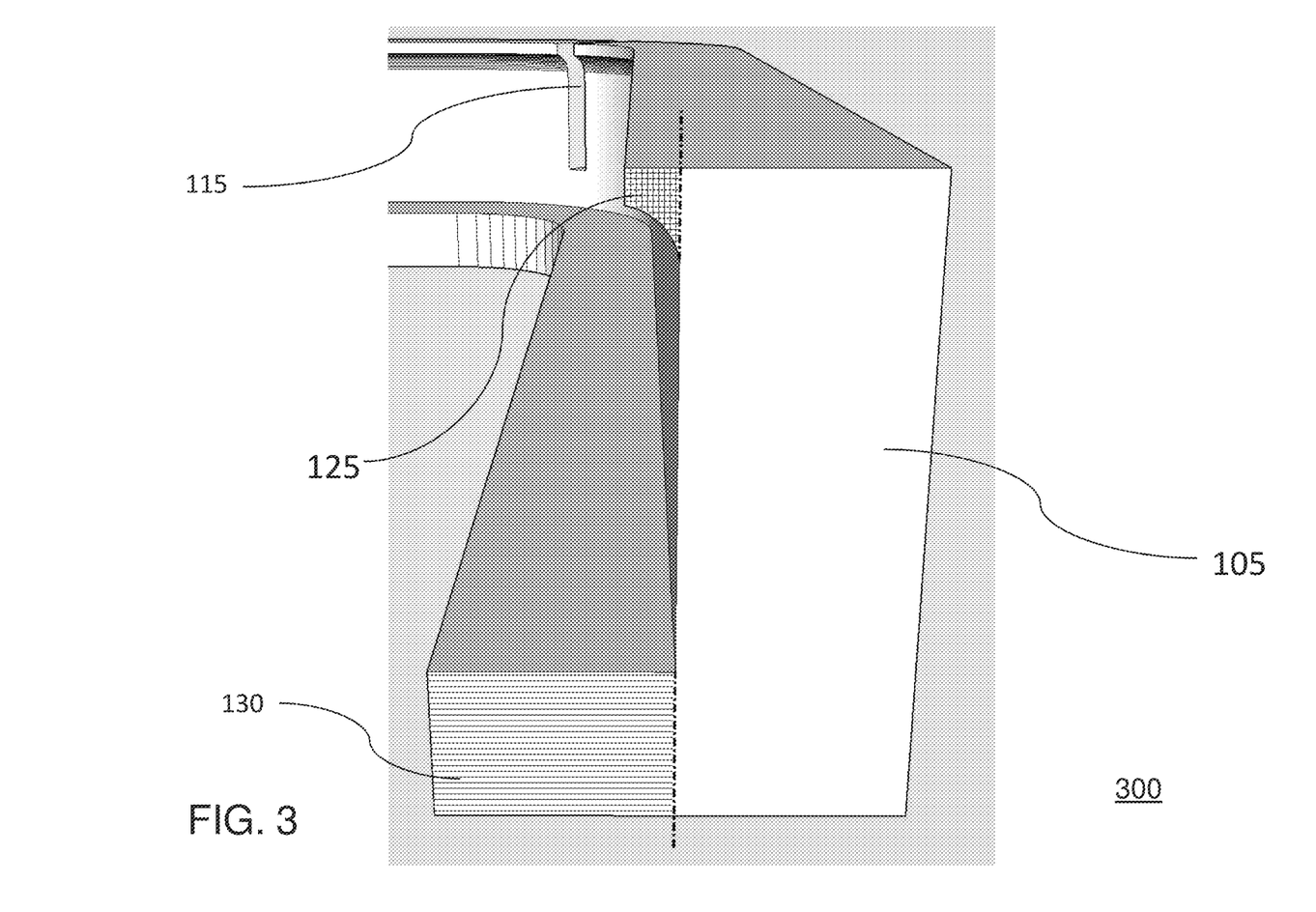
FIG. 3 illustrates a cross-section view of a slit and a lip at a corner region of a protective frame 300, in accordance with an embodiment of the present disclosure.

FIG. 3 illustrates a cross section of the protective frame shown in FIG. 1. The cross section shows 3 separate regions for sake of clarity. The edge region 105, shown as a vertical edge, protects the sides of the device. The base 130 is attached to the edge region 105 and is marked with horizontal lines in FIG. 3. Both the lip 125 and base 130 is curvature or extension of the edge 105 which together secures the device within. The base region's functionality is to connect all edge regions together. The base region also acts as a stopper in order to secure the inserted (not shown) device from slipping out from the bottom side of the protective case. The grid region 125 is connected to the edge region 105 and is marked with a grid lines in FIG. 3. The lip region 125 secures the device between the lip 125 and the base 130. Additionally the slit 115 is a separation that can through the lip 125 but partially of fully though the edge region 105 to allow flexibility to insert a device into the protective case. The slit 115 also can go through both the lip 125 and the edge 105 and extend partially into the base 130. The edge 105, lip 125 and base 130 are all made from non-stretchable material.

Figure 4:
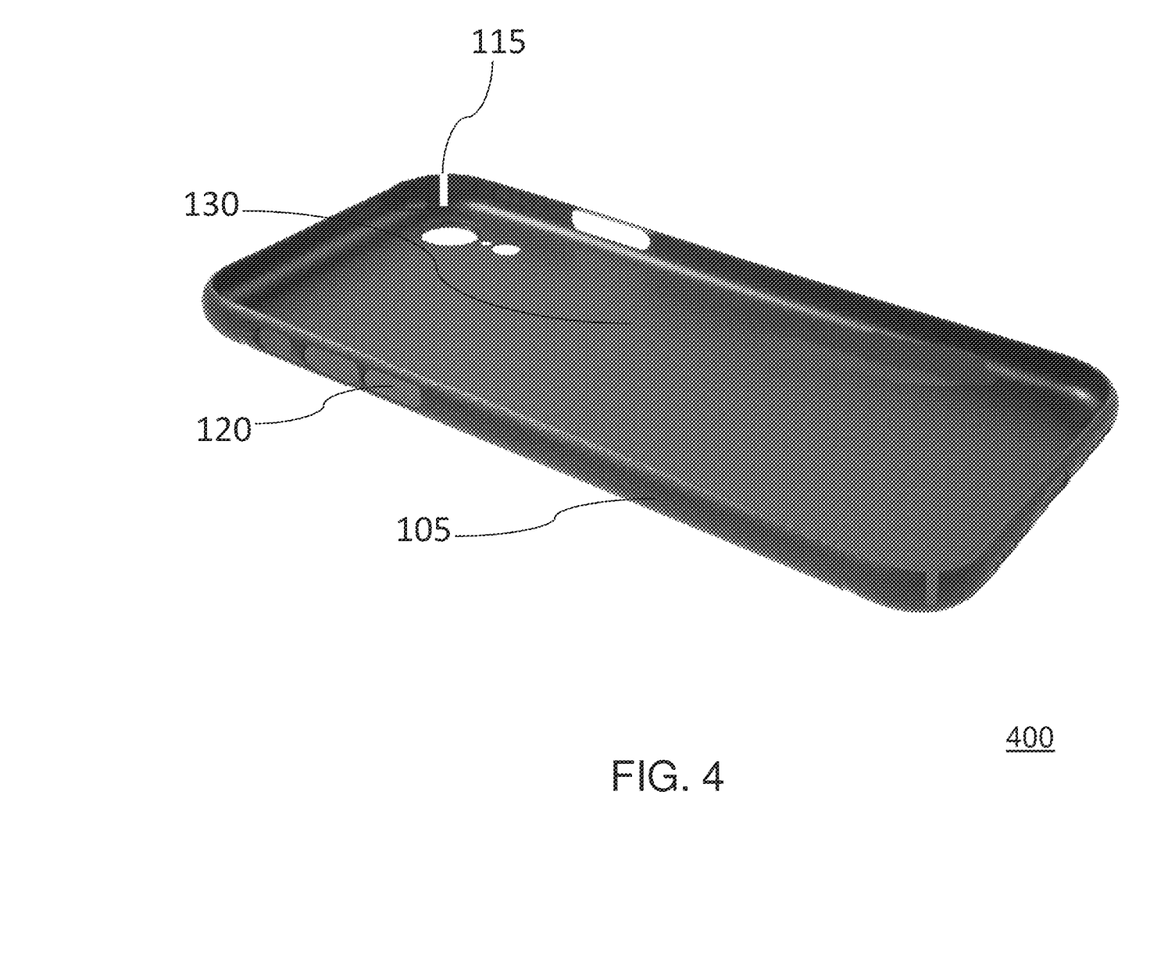
FIG. 4 illustrates a protective frame 400, in accordance with an embodiment of the present disclosure.

FIG. 4 illustrates the protective frame 400, in accordance with an embodiment of the present disclosure. The window 120 is featured to provide access to operate the device including but not limited to access to speakers of the device, to at least one display, buttons, charging port or any other operational functionality. The slits 115 plays a crucial role in allowing a device inserted into the edge 105 of the frame 400 that is made from a non-stretchable semi-rigid or rigid material with very little flexibility. Additionally the frame can have a back protection layer 130 to protect the back side that is opposite to the display in most devices. The back side also can be absent or have a window 120 shown in FIG. 1 in the protective frame 400. This protective frame 400 also can be configured to be inverted wherein the protective frame is inserted on the device from top instead of bottom with a window 120 to operate display as shown in FIG. 1.

Figure 5:
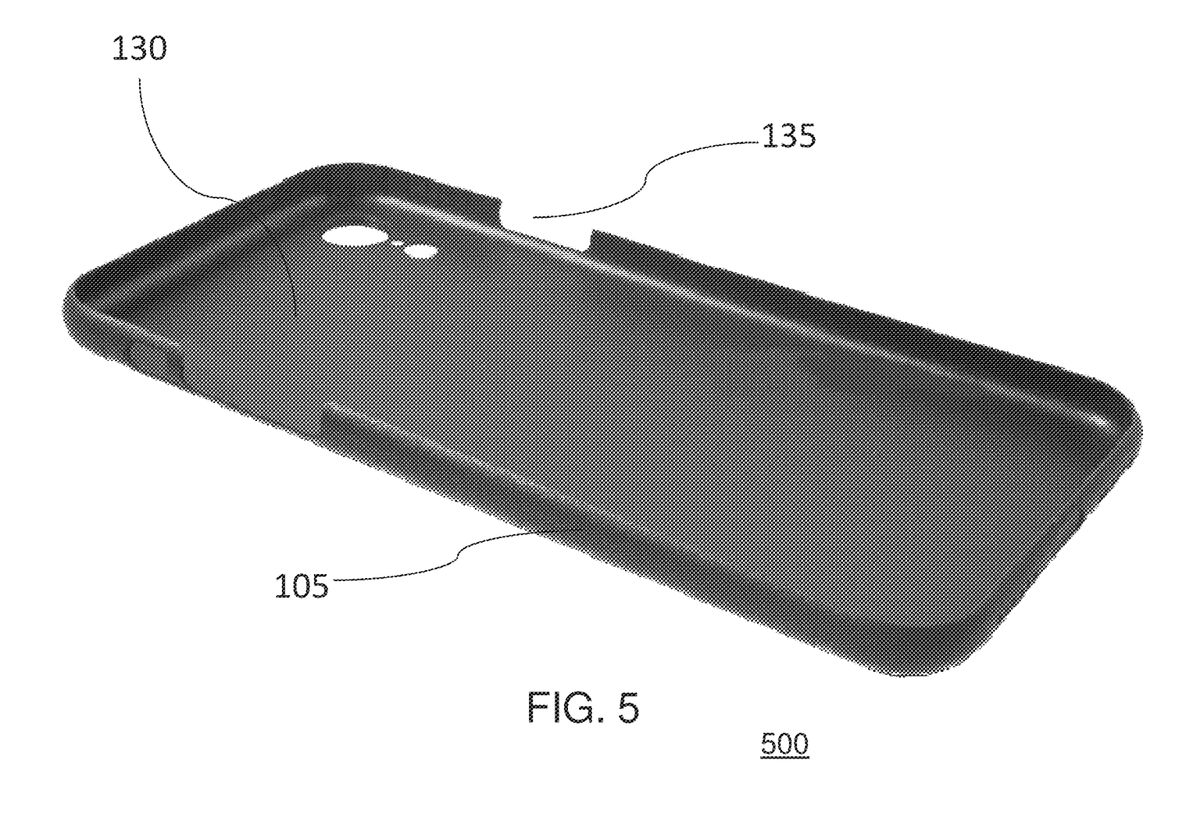
FIG. 5 illustrates a protective frame 500, in accordance with an embodiment of the present disclosure.

FIG. 5 illustrates the protective frame 500, in accordance with an embodiment of the present disclosure. The slit 115 is missing here at the corner instead a wider slit 135 which serves a dual purpose of providing flexibility the edge 105 need to insert the device and an access to operate the device that is inserted into the protective frame 500 that is made from a non-stretchable semi-rigid or rigid material with very little flexibility. Additionally the frame can have a back protection layer 130 to protect the back side that is opposite to the display in most devices. The back side also can be absent by leaving a window 120 as shown in FIG. 1 in the bottom part of the protective frame 400. This protective frame 400 also can be configured to be inverted wherein the protective frame is inserted on the device from top instead of bottom.

Figure 6:
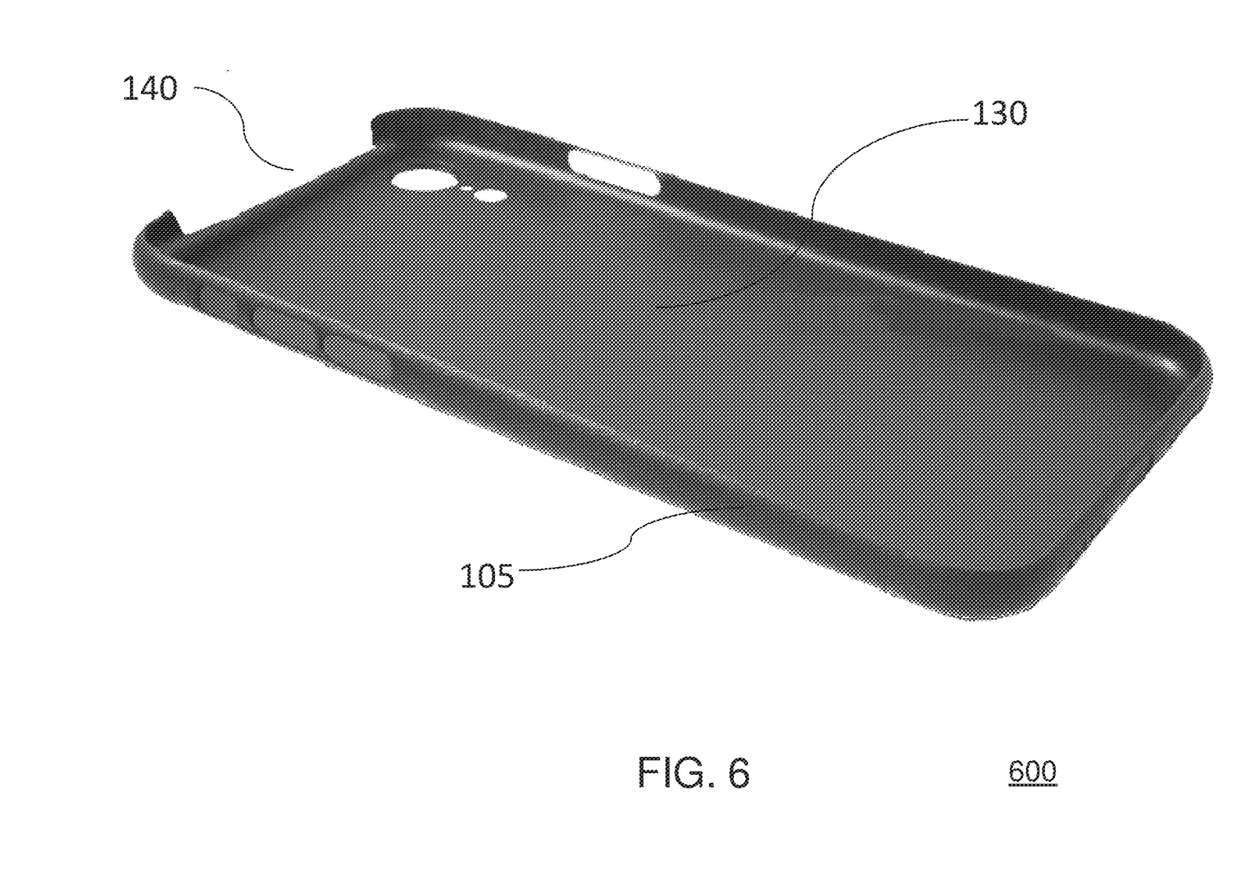
FIG. 6 illustrates a protective frame 600, in accordance with an embodiment of the present disclosure.

FIG. 6 illustrates the protective frame 600, in accordance with an embodiment of the present disclosure. The slit 115 is missing here at the corner instead a wide slit 140 provides flexibility the edge 105 need to insert the device into the protective frame 500 that is made from a non-stretchable semi-rigid or rigid material with very little flexibility. The wide slit 140 can be shorter in width than the entire side thus will cover at least small portion on the side the wide slit 140 had been situated around. The wide slit also can be as wide as the entire side it's protecting providing flexibility needed for a device to be inserted inn.

Figure 7:
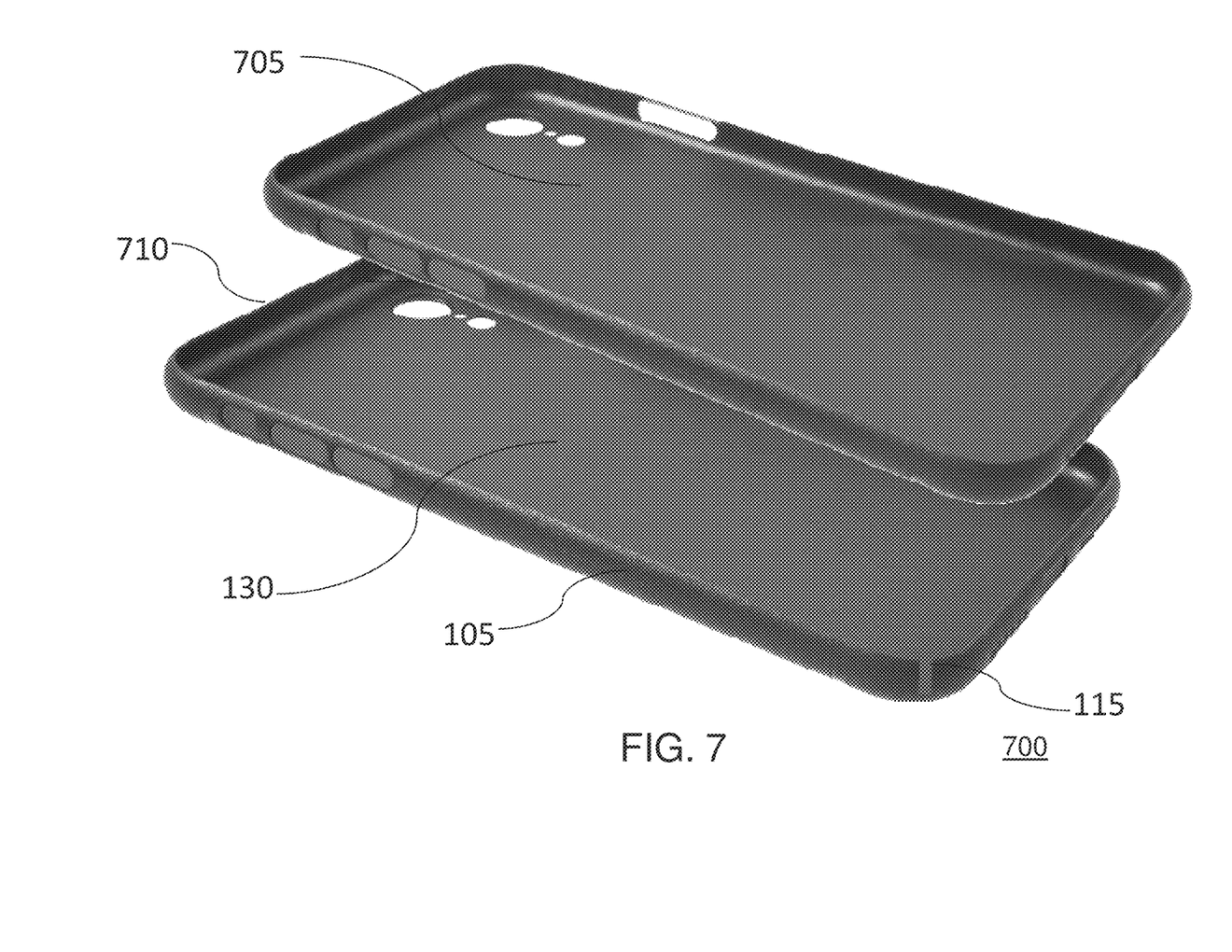
FIG. 7 illustrates a protective frame 700, in accordance with an embodiment of the present disclosure.

FIG. 7 illustrates the protective frame 700 with a 2-piece design wherein the outer frame 710 being used with an inner soft frame 605 made from a softer material than the protective frame 710 which is made from a non-stretchable semi-rigid or rigid material with very little flexibility. The protective frame 710 has a slit 115 present at the corner which can be present anywhere in the edge 105 surface to provide needed flexibility. Additionally the frame 705 made from softer and stretchable material can have various configurations and coverage with larger windows or cushion points to provide usability and protection against an impact. The frame 705 also can be made with softer edge surfaces and harder back surfaces. Additionally the frame 705 can have a window 120 as shown in FIG. 1. Additionally the frame can have a back protection layer 130 to protect the back side that is opposite to the display side in most devices. The back side also can be absent by leaving a huge window in the bottom part of the protective frame 700. This protective frame 600 also can be configured to be inverted wherein the protective frame is inserted on the device from top instead of bottom keeping rest of the configuration very identical. The protective frame 700 also can be configured to have each of two pieces 705 and 710 to be inserted from opposite sides. In other words the frame 705 can be designed to be inserted on the device from the top while the frame 710 can be designed to be inserted from the bottom or wise-versa.

FIG. 8 to FIG. 11 illustrates a protective frame made in 2 pieces with each of the two pieces having multiple wide slits, edge surfaces and lip that enables each of the two frame pieces to be latched on the device independently. Due to each of the case pieces latches on the device separately, the bulkiness of the case can be minimized and both the pieces together can provide better coverage over any of existing configurations. By having multiple latching points, the configuration assures firmer latching of the case on the device. By having at least one latching point on each side, the case is configured to stay flushed with the device most of the time even during sudden movements of the device. This 2 piece protective frame configurations can be made from any non-stretchable or any stretchable materials. The 2 piece configuration variations shown in this application has each of the two pieces latches independently to the device. As shown in FIGS. 8 to 11, at least one of the two frame pieces latches at 3 spots to the device providing better attachment of the frame piece to the device it's been latched upon. Additionally the configurations shown in the FIGS. 8 to 11 can also be used in conjunction with a soft frame inside or a softer layer inside to enhance the protection to the device.

Figure 8:
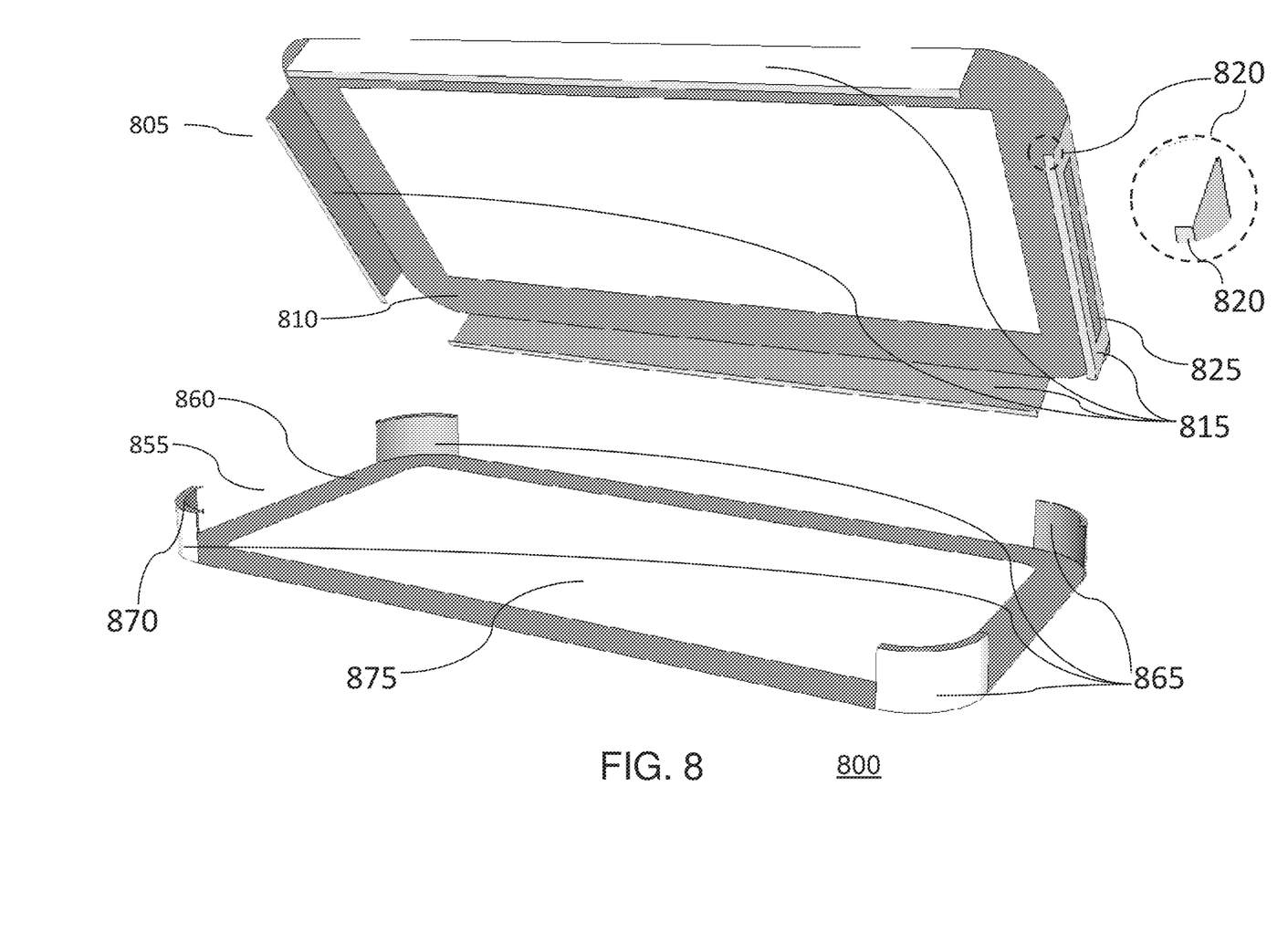
FIG. 8 illustrates a protective frame 800, in accordance with an embodiment of the present disclosure.

FIG. 8 illustrates the protective frame 800 that features a 2-piece design wherein the top frame piece 805 and the bottom frame piece 855 latches on the device (not shown) independently and provides protection to the device. The top frame piece 805 has a base 810 from which an edge surface 815 protrudes to provide protection to the sides of the device (not shown). The top frame piece 805 latches on the device with help of lip 820. The edge surface 815 is missing near corner regions of the top frame piece 805. This missing edge surface near the corner regions provides flexibility for the frame to be inserted upon the device. The bottom frame piece 855 has a base 860 from which an edge surface 865 protrudes to provide protection to the corners of the device (not shown). The bottom frame piece 855 latches on the device with help of lip 870 present on multiple edge surface 865. The edge surface 865 is missing in the straight regions (between neighbouring corners) of the bottom frame piece 855. This missing edge surface near the corner regions provides flexibility for the frame to be inserted upon the device if the frame is made from non-stretchable or semi-rigid material. The window 825 and 875 also can feature to enhance appearance or to provide access to the device. Together both the frame pieces 805 and 810 can be configured to provide protection to the all four sides and corners surrounding the display or to provide protection to all surfaces of the device while providing access to operate the device where needed. This configuration shown in the FIG. 8 serves a dual purpose if the frame 800 is made from a non-stretchable material of provide little flexibility so the each of the frame pieces can be inserted over the device and reduces overall bulkiness. The frame 800 also can be made from semi-rigid or flexible material in which this configuration will help reduce overall bulkiness of the case. The device can be operated, charged or used for any of its audio or visual capabilities using an access window 875 that can be present anywhere on the top frame piece 805 or the bottom frame piece 855 or can be featured by having no coverage to the device at certain area from any of the two frame pieces 805 and 810 to provide accessibility to the device from missing coverage region.

Figure 9:
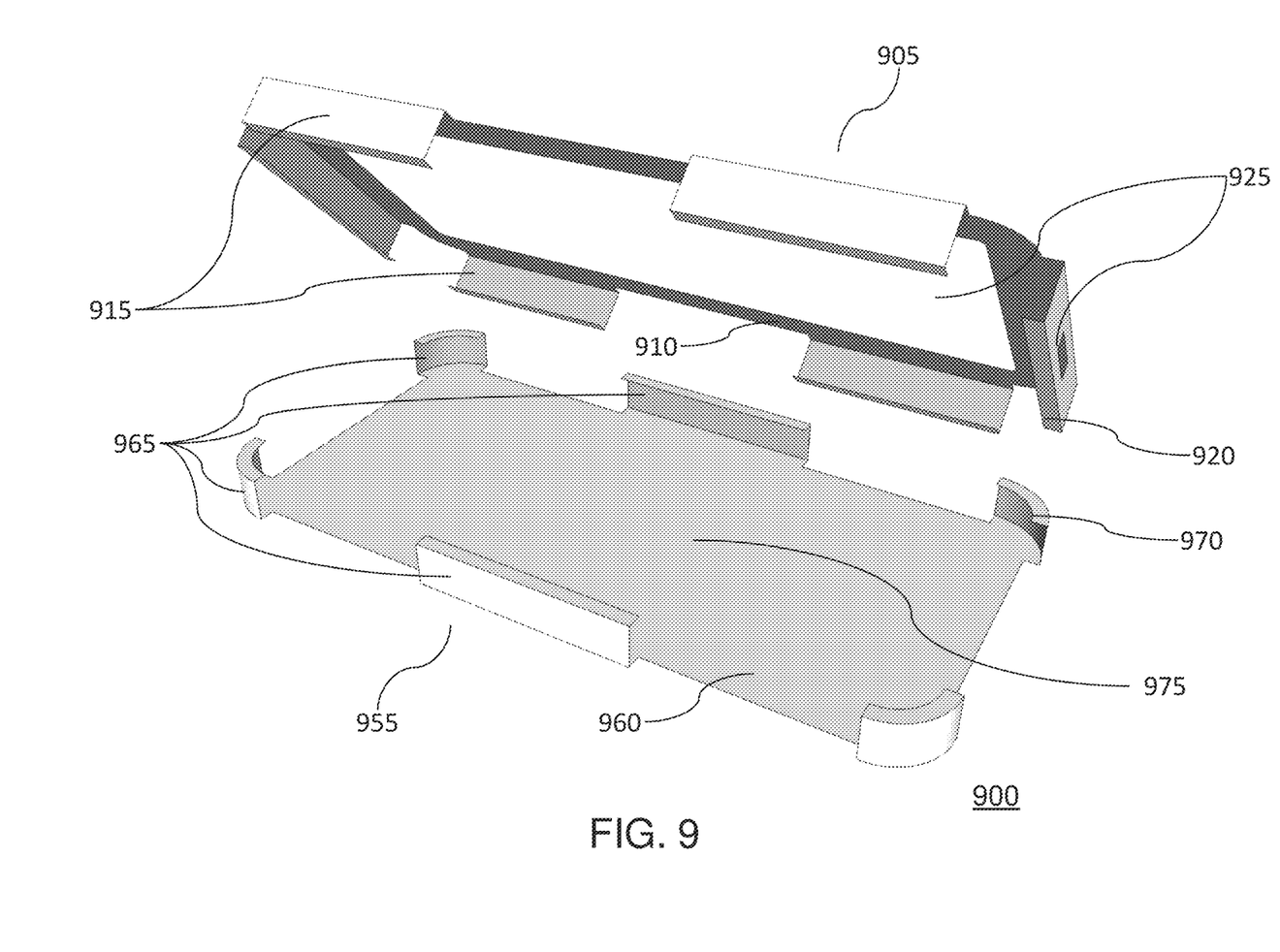
FIG. 9 illustrates a protective frame 900, in accordance with an embodiment of the present disclosure.

FIG. 9 illustrates the protective frame 900 that features a 2-piece design wherein the top frame piece 905 and the bottom frame piece 955 latches on the device (not shown) independently and provides protection to the device. The top frame piece 905 has a base 910 from which an edge surface 915 protrudes to provide protection to the sides of the device (not shown). The top frame piece 905 latches on the device with help of lip 920. The edge surface 915 is missing near corner and straight regions of the top frame piece 905. This missing edge surface provides flexibility to the frame piece 905 to be inserted on the device. The bottom frame piece 955 has a base 960 from which an edge surface 965 protrudes to provide protection to the corners of the device (not shown). The bottom frame piece 955 latches on the device with help of lip 970 present on multiple edge surface 965. The edge surface 965 is missing in the straight regions (between neighbouring corners) of the bottom frame piece 955. This missing edge surface provides flexibility for the frame piece 955 to be inserted upon the device. Additionally any of the two frame pieces can feature an access to the device on any of the frame pieces 905 and 910. Together both the frame pieces 905 and 910 can be configured to provide protection to the all four sides and corners surrounding the display or to provide protection to all surfaces of the device while providing access to operate the device where needed. This configuration shown in the FIG. 9 serves a dual purpose if the frame 900 is made from a non-stretchable material of provide little flexibility so the each of the frame pieces can be inserted over the device and reduces overall bulkiness. The frame 900 also can be made from semi-rigid or flexible material in which this configuration will help reduce overall bulkiness of the case. The device can be operated, charged or used for any of its audio or visual capabilities using an access window 925 that can be present anywhere on the top frame piece 905 or the bottom frame piece 955 or can be featured by having no coverage to the device at certain area from any of the two frame pieces 905 and 910 to provide accessibility to the device from missing coverage region.

Figure 10:
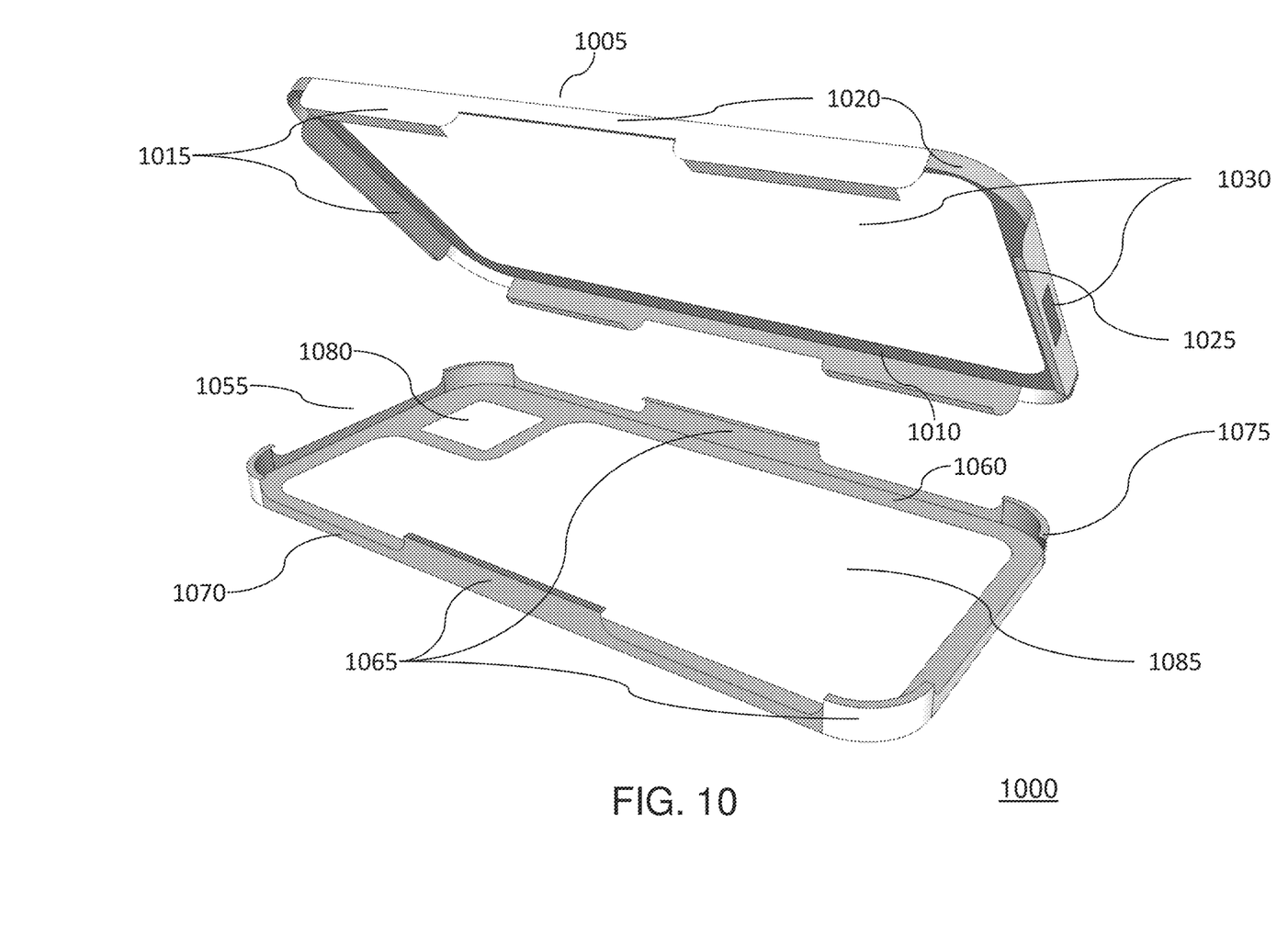
FIG. 10 illustrates a protective frame 1000, in accordance with an embodiment of the present disclosure.

FIG. 10 illustrates the protective frame 1000 that features a 2-piece design wherein the top frame piece 1005 and the bottom frame piece 1055 latches on the device (not shown) independently and provides protection to the device. The top frame piece 1005 has a base 1010 from which an edge surfaces 1015 and 1020 protrudes to provide protection to the sides of the device (not shown). The edge surface 1015 latches on the device with help of lip 1025. The edge surface 1020 does not extend as much as the edge surface 1015 to provide a space to the edge surface 1065 from the bottom frame piece 1055. The bottom frame piece 1055 has a base 1060 from which an edge surfaces 1065 and 1070 protrudes to provide protection to the corners of the device (not shown). The edge surface 1065 latches on the device with help of lip 1075. The edge surface 1070 does not extend as much as the edge surface 1065 to provide a space to the edge surface 1015 from the top frame piece 1005. Additionally any one or both frame pieces 1005 and 1055 can feature an access to the device with windows 1030, 1080 or 1085 or by not covering an area to provide access to the device. This configuration shown in the FIG. 10 serves a dual purpose if the case 1000 is made from a non-stretchable material of provide little flexibility so the each of the case pieces can be inserted over the device and reduces overall bulkiness. The case 1000 also can be made from semi-rigid or flexible material in which this configuration will help reduce overall bulkiness of the case.

Figure 11:
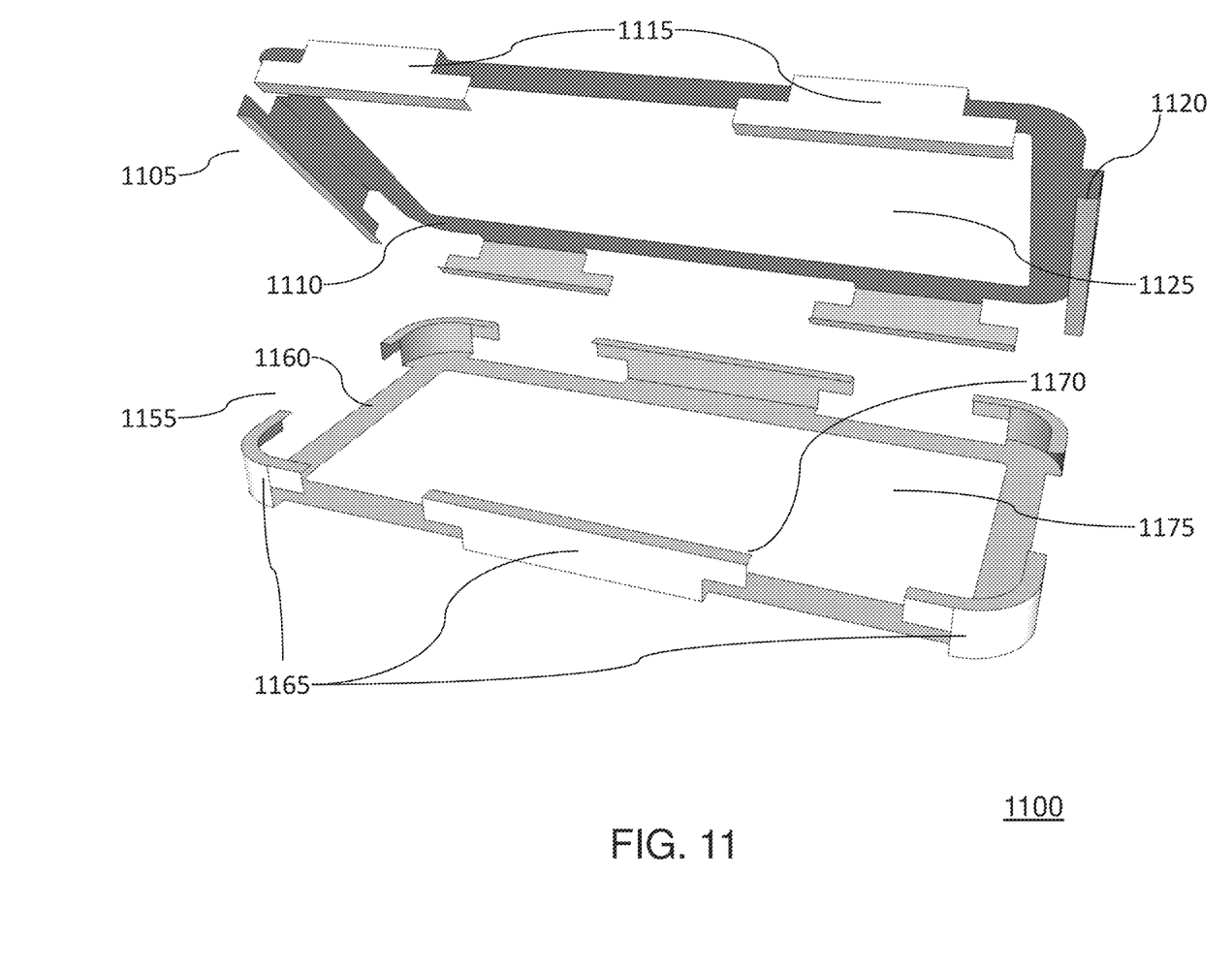
FIG. 11 illustrates a protective frame 1100, in accordance with an embodiment of the present disclosure.

FIG. 11 illustrates the protective frame 1100 that features a 2-piece design wherein the top frame piece 1105 and the bottom frame piece 1155 latches on the device (not shown) independently and provides protection to the device while both the frame pieces interlocking themselves to one another too. The top frame piece 1105 has a base 1110 from which an edge surface 1115 protrudes to provide protection to the sides of the device (not shown). The edge surface 1115 latches on the device with help of lip 1120. The bottom frame piece 1155 has a base 1160 from which an edge surface 1165 protrudes to provide protection to the corners and a portion of straight sides between the two corners of the device (not shown). The edge surface 1165 latches on the device with help of lip 1170. As shown in FIG. 11 both edge surfaces 1115 and 1165 are configured to interlock one-other for latching or providing protection to the device. Additionally any one or both frame pieces 1105 and 1155 can feature an access to the device with windows such as 1125 or 1175 or by not covering an area to provide access to the device. This configuration shown in the FIG. 11 serves a dual purpose if the frame 1100 is made from a non-stretchable material of provide little flexibility so the each of the frame pieces can be inserted over the device and reduces overall bulkiness. The frame 1100 also can be made from semi-rigid or flexible material in which this configuration will help reduce overall bulkiness of the case.

Figure 12:
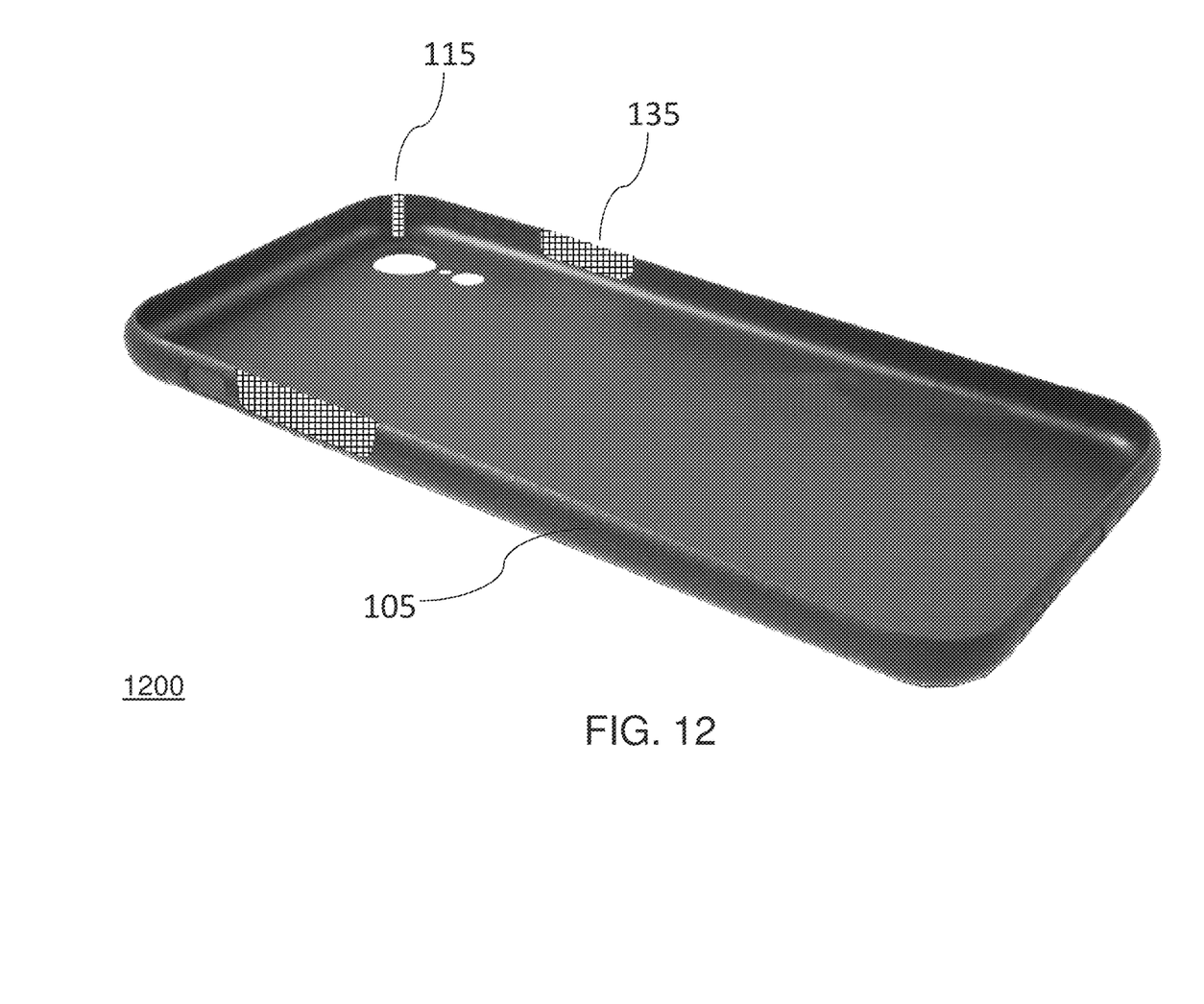

FIG. 12 illustrates the protective frame 1200, in accordance with an embodiment of the present disclosure. The slit 115 is covered by a softer or stretchable material (grid) to allow flexibility to the edge 105 needed to insert a device. The layer made from a softer material than the material of the edge, marked as grid covering the slit 105. It is still a slit, but covered by a softer or flexible material to provide continuous protection. Also a wider slit 135 which serves a dual purpose of providing flexibility to insert the device and an access to operate the device, also has a slit 135 with a grid which represents a softer or stretchable material conjoining the slit 135. This material covering slit area provides a protection, provides access since the material is flexible and provides enough flexibility for the edges 105 to flex during insertion of a device into frame 1200. This similar set up using a softer or stretchable material to cover any slit can be applied to any or all of the previous embodiments. Additionally the slit 115 or window 120 (shown in FIG. 4) covered by a softer layer can have a softer later that protrudes furtherer than the neighbouring surface around it and provide a grip when the frame is being used on a slippery surface. The similar set up can be used in any of the variations shown in the application for a purpose of providing a visuals or grip so the frame will not slide easily even on a slippery surfaces.

The invention claimed is:

1. A protective case for an electronic device, that provides access to at least one functionality of the electronic device, comprising:
   a base surface, at least one edge surface, at least one protruding lip and at least one slit;
   wherein the base surface is configured to provide protection to the bottom side of the electronic device; wherein the base surface extends into the at least one edge surface; is configured to provide protection to at least four sides and at least four corners adjacent to the top side and the bottom side of the electronic device; wherein at least one of the at least one edge surface is configured to have the at least one protruding lip; wherein the base surface, the at least one edge surface, and the at least one protruding lip are made of a rigid material;
   wherein the at least one slit goes through the at least one protruding lip and at least partially and/or fully through the at least one edge surface, wherein the at least one slit is located at and/or near the respective corner of the protective case; wherein the at least one slit is configured to flex the at least one protruding lip enough to enable insertion of the electronic device;
   wherein an edge of the at least one protruding lip directly secures and protects the surrounding edges and corners of the top side of the electronic device with the rigid material, wherein the edge of the at least one protruding lip features at least two curvatures, wherein at least one of the at least two curvatures secures each of at least two opposite corners of the at least four corners surrounding to the top side of the electronic device respectively.

2. The protective case as claimed in claim 1, wherein the at least one slit is configured to serve dual purpose to flex the at least one edge surface and the at least one protruding lip enough to enable insertion of the electronic and to provide access to at least one functionality of the electronic device.

3. The protective case as claimed in claim 1, wherein the rigid material is made out of at least one of following:
   a. a wooden material;
   b. a plastic material;
   c. a carbon-fiber material;
   d. a metal material;
   e. a polymer material;
   f. a rigid synthetic material;
   g. an aramid fiber material;
   h. a rigid non-synthetic material.

4. The protective case as claimed in claim 1, wherein the base surface and/or the at least one edge surface has at least one window.

5. The protective case as claimed in claim 1, wherein the protective case is used in combination with another case to provide at least multiple layers of protection.

6. The protective case as claimed in claim 1, wherein the at least one lip is configured by shaping the at least one edge surface to latch.

7. The protective case as claimed in claim 1, wherein the at least one slit is covered by a softer material to provide flexibility and continuous protection.

8. The protective case as claimed in claim 1, wherein at least one window has at least one softer material protruding outward of the rigid protective case wherein the at least one softer material provides grip that helps prevent the case from sliding on a smooth surface.

9. A protective case for an electronic device, that provides access to at least one functionality of the electronic device, comprising:
   a base surface, at least one edge surface, at least one protruding lip and at least one slit;
   wherein the base surface is configured to provide protection to the bottom side of the electronic device and extends into the at least one edge surface; that is configured to provide protection to at least four sides and at least four corners adjacent to the top side and the bottom side of the electronic device; wherein the at least one edge surface further extends into the at least one protruding lip;
   wherein an edge of the at least one protruding lip features at least two curvatures, wherein at least one of the at least two curvatures secures each of at least two opposite corners of the at least four corners surrounding to the top side of the electronic device respectively;
   wherein the base surface, the at least one edge surface and the at least one protruding lip are made of a rigid material;
   wherein the at least one slit goes through the at least one protruding lip and at least partially and/or fully through the at least one edge surface, wherein the at least one slit is configured to flex the at least one edge surface and the at least one protruding lip enough to enable insertion of the electronic device and to secure the electronic device within the protective case, wherein an edge of at least one of the at least one protruding lip protrudes inward of an inner contacting surface attached to the at least one edge surface to provide protection with the rigid material to the surrounding edges and corners of the top surface except for the at least one slit.

10. The protective case as claimed in claim 9, wherein the at least one slit is configured to serve dual purpose to flex the at least one edge surface and the at least one protruding lip enough to enable insertion of the electronic and to provide access to at least one functionality of the electronic device.

11. The protective case as claimed in claim 9, wherein the rigid material is made out of at least one of following:
   a. a wooden material;
   b. a plastic material;
   c. a carbon-fiber material;
   d. a metal material;
   e. a polymer material;
   f. a rigid synthetic material;
   g. an aramid fiber material;
   h. a rigid non-synthetic material.

12. The protective case as claimed in claim 9, wherein the base surface and/or the at least one edge surface has at least one window.

13. The protective case as claimed in claim 9, wherein the protective case is used in combination with another case to provide at least multiple layers of protection.

14. The protective case as claimed in claim 9, wherein at least one window has at least one softer material protruding outward of the rigid protective case wherein the at least one softer material provides grip that helps prevent the case from sliding on a smooth surface.

15. The protective case as claimed in claim 9, wherein the protective case has a softer layer permanently secured to the protective case.

16. A protective case for an electronic device, that provides access to at least one functionality of the electronic device, comprising:
   a base surface, at least one edge surface, at least one protruding lip, at least one slit, and a softer surface;
   wherein the base surface is configured to provide protection to the bottom side of the electronic device and extends into the at least one edge surface; wherein the at least one edge surface is configured to provide protection to at least four sides and at least four corners adjacent to the top side and the bottom side of the electronic device; wherein the at least one edge surface is configured to have the at least one protruding lip wherein an edge of the at least one protruding lip features at least two curvatures, wherein at least one of the at least two curvatures secures each of at least two opposite corners of the at least four corners surrounding to the top side of the electronic device respectively;
   wherein the base surface, the at least one edge surface and the at least one protruding lip are made of a rigid material;
   wherein the at least one slit goes through the at least one protruding lip and at least partially and/or fully through the at least one edge surface;
   wherein the softer surface, made of a material softer than the rigid material, is configured to be sandwiched between the rigid material and the electronic device; wherein an edge of the at least one of the at least one protruding lip protrudes inward of an inner contacting surface of the softer surface to provide protection with the rigid material to the surrounding edges and corners of the top surface except for the at least one slit.

17. The protective case as claimed in claim 16, wherein the at least one slit is configured to serve dual purpose to flex the at least one edge surface and the at least one protruding lip enough to enable insertion of the electronic and to provide access to at least one functionality of the electronic device.

18. The protective case as claimed in claim 16, wherein the rigid material is made out of at least one of following:
   a. a wooden material;
   b. a plastic material;
   c. a carbon-fiber material;
   d. a metal material;
   e. a polymer material;
   f. a rigid synthetic material;
   g. an aramid fiber material;
   h. a rigid non-synthetic material.

19. The protective case as claimed in claim 16, wherein the base surface and/or the at least one edge surface has at least one window.

20. The protective case as claimed in claim 16, wherein at least one window has at least one softer material protruding outward of the rigid protective case wherein the at least one softer material provides grip that helps prevent the case from sliding on a smooth surface.

* * * * *